United States Patent [19]

Hakoyama

[11] 4,216,481
[45] Aug. 5, 1980

[54] METHOD OF DRIVING A THERMAL HEAD AND APPARATUS THEREFOR

[75] Inventor: Akiyoshi Hakoyama, Hitachi, Japan

[73] Assignee: Hitachi, Ltd., Tokyo, Japan

[21] Appl. No.: 38,421

[22] Filed: May 14, 1979

[30] Foreign Application Priority Data

May 15, 1978 [JP] Japan .................................. 53-57271

[51] Int. Cl.² .......................... G01D 15/10; H05B 1/00
[52] U.S. Cl. ............................... 346/76 PH; 346/1.1; 219/216
[58] Field of Search .................... 346/76 PH; 219/216; 400/120

[56] References Cited

U.S. PATENT DOCUMENTS

| | | | |
|---|---|---|---|
| 3,163,489 | 12/1964 | Borne et al. | 346/76 PH |
| 3,975,707 | 8/1976 | Ito et al. | 346/76 PH |
| 4,091,391 | 5/1978 | Kozima et al. | 346/76 PH |
| 4,136,274 | 1/1979 | Shibata et al. | 346/76 PH X |
| 4,141,018 | 2/1979 | Mizuguchi et al. | 346/76 PH |

FOREIGN PATENT DOCUMENTS

1245181 7/1967 Fed. Rep. of Germany ...... 346/76 PH

Primary Examiner—George H. Miller, Jr.
Attorney, Agent, or Firm—Craig and Antonelli

[57] ABSTRACT

Method of and apparatus for driving, in accordance with a recording signal, a thermal head including a plurality of heating blocks each having M aligned heating elements (M: a positive integer), the amplitude of the recording signal being at a low level or at a high level, in which the number of occurrences of the high level in the recording signal is counted and a block drive signal is produced when the counted number reaches a pre-set value K (K: a positive integer larger than M), the sum of the number of occurrences of the high level and that of the low level in that signal portion of the recording signal within which the high level occurs K times being N, and the number P (P: a positive integer) of successive heating blocks is determined to simultaneously enable the heating elements of the P successive heating blocks in accordance with that signal portion of the recording signal within which the high level occurs not more than K times where $P \times M \leq N < (P+1) \times M$.

3 Claims, 6 Drawing Figures

METHOD OF DRIVING A THERMAL HEAD AND APPARATUS THEREFOR

BACKGROUND OF THE INVENTION

1. Field of the Invention

The present invention relates to a method of and apparatus for driving, in accordance with a recording signal, a thermal head including a plurality of aligned heating elements.

2. Description of the Prior Art

In a prior art thermal recording apparatus with a thermal head of the above-mentioned type, a current pulse signal being at a high level or a low level is supplied as a recording signal to heating elements to selectively cause them to heat so that a desired pattern can be displayed on a thermal recording paper. When performing one line of recording, the heating elements of a thermal head are usually divided into a number of groups and the groups are successively enabled in consideration of the scale of a driving circuit, the capacity of a power supply for recording and the thermal characteristics of the thermal head. However, on the one hand, the number of heating elements included in each group which are enabled simultaneously in accordance with the recording signal is predetermined irrespective of an information pattern of the recording signal, and on the other hand, the capacity of the power supply for recording is designed to match the maximum number of the heating elements which are simultaneously caused to heat within one group. Therefore, due to the fact that the probability that the maximum number of the heating elements in each group are simultaneously caused to heat is extremely small in the course of practical recording, the scale of the recording apparatus unnecessarily becomes large to disadvantage.

This tendency is notable especially in high speed thermal recording apparatus. A solution to this problem has been proposed, for example, in Japanese Patent Application Laid-open No. 56544/77 (laid open to public on May 10, 1977), wherein heating elements included in each group are further divided into a number of blocks, which number is varied dependent on the number of high levels in a recording signal portion associated with each group, and the blocks are then successively enabled.

With this proposal, however, the division into the groups is fixed and irrespective of the distribution of high levels in the recording signal and therefore, even when the rate of appearance of the high levels is not so large, the number of divisions into the blocks may be too large to thereby prevent effective increase in the recording speed.

SUMMARY OF THE INVENTION

The present invention has for its primary object to eliminate the prior art disadvantages and to provide a method of and apparatus for driving a thermal head at higher recording speeds with a power supply for recording of relatively small capacity.

According to this invention, the number of occurrences of a high level in a recording signal which is supplied to a thermal head including a plurality of heating blocks each having M (M: a positive integer) heating elements is successively counted, and when the counted value reaches a pre-set value K (K: a positive integer larger than M), the heating elements of P (P: a positive integer) successive heating blocks are enabled simultaneously in accordance with the recording signal, where $N/M - 1 < P \leq N/M$, N being the sum of the number of occurrences of the high level and that of the low level in that portion of the recording signal within which the high level occurs K times.

DESCRIPTION OF THE PREFERRED EMBODIMENTS

Figure 1:
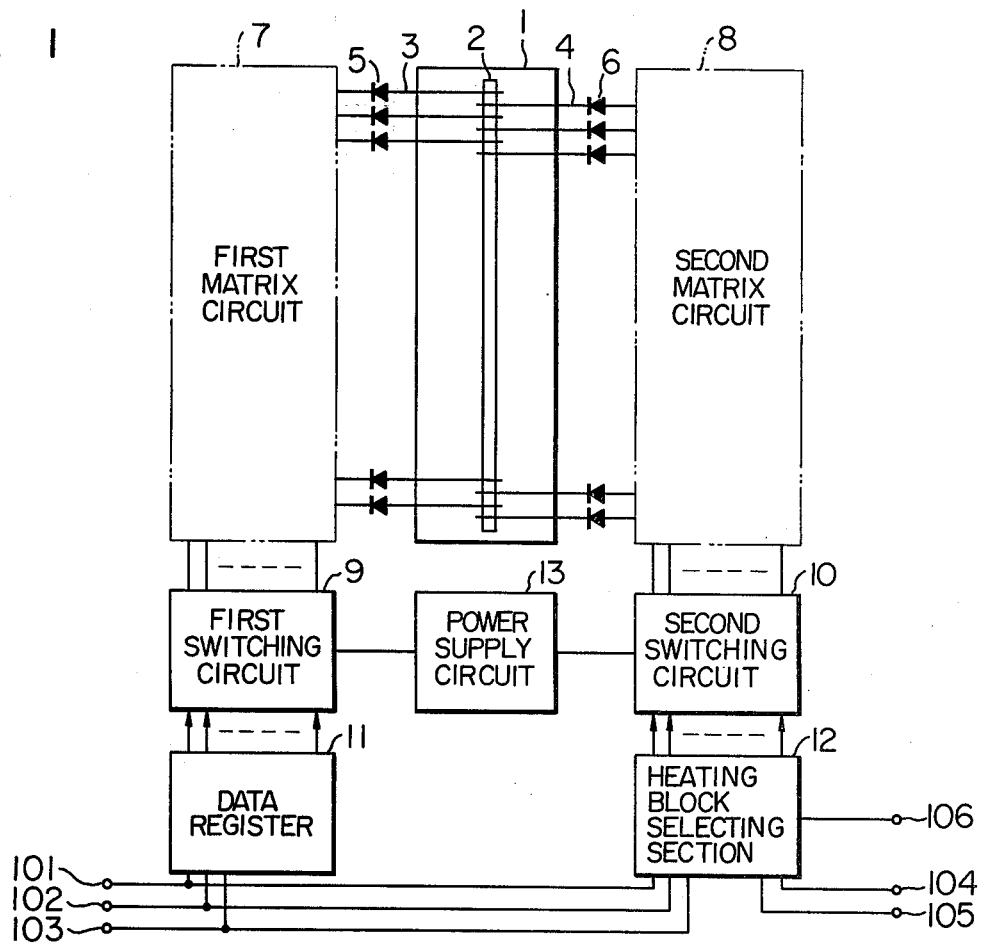
FIG. 1 is a block diagram showing the essential part of a thermal recording system to which the invention is applicable.

In a thermal recording system shown in FIG. 1, a recording thermal head 1 includes 720 aligned heating elements 2, for example. Lead wires 3 and 4 to define individual heating elements are led out alternately on left and right sides of the aligned heating elements, and connected to a first terminal group of a first matrix circuit 7 via diodes 5 and to a first terminal group of a second matrix circuit 8 via diodes 6, respectively. The first matrix circuit 7 has a second terminal group of 180 terminals, for example, connected to a first switching circuit 9 which in turn is connected to a terminal representative of a first pole (for example, a negative pole) of a recording power supply circuit 13. The second matrix circuit 8 has a second terminal group of 36 (4 groups × 9 heating blocks) terminals, for example, and is connected to a terminal representative of a second pole (for example, a positive pole) of the power supply circuit 13 via a second switching circuit 10. The first switching circuit 9 has the other terminal group of 180 terminals connected to 180 output terminals of a data register 11. This data register stores a recording signal which may be recorded by the 720 heating elements. The second switching circuit 10 has the other terminal group of 36 terminals connected to 36 output terminals of a heating block selecting section 12. Accordingly, the first switching circuit 9 operates, in accordance with the output of the data register 11, to selectively connect 180 lead wires of one of two lead wire sets each including 180 lead wires as designated by reference numeral 3 to the negative pole of the power supply circuit 13. The second switching circuit 10 operates, in accordance with the output of the heating block selecting section 12, to selectively connect 36 lead wire sets each including 10 lead wires as designated by reference numeral 4 to the positive pole of the power supply circuit 13. Namely, 720 heating elements 2 are divided into four groups and each group is further divided into 9 heating blocks. Consequently, each heating block includes 20 (M) heating elements 2. The number of groups into which the heating elements 2 are divided is not essential to the subject matter of the present invention.

By connecting 180 lead wires on the data register 11 side and 36 lead wire sets of the lead wires on the heating block selecting section 12 side to the recording power supply circuit 13 via the diodes and, respectively, a number of the heating elements, being 180 to the maximum, among the 720 heating elements are supplied with a current and caused to heat so that those portions of the thermal recording paper which are in contact with the heating elements caused to heat are colored. As described above, the thermal head 1 includes 720 (180×4) aligned heating elements. Therefore, when the 36 second terminals of the second matrix circuit 8 are individually connected to the recording power supply circuit 13 while exchanging the binary recording signal data, for example, 180 in number, stored in the data register 11, one line of recording pattern can be displayed on the thermal recording paper. It should be noted that the number of the second terminals of the second matrix circuit 8 to be simultaneously connected to the power supply circuit 13 is dependent on the distribution of the high levels in the recording signal.

When the thermal recording paper is fed intermittently in the direction perpendicular to an array of the aligned heating elements 2 and the recording operation in one line is repeated, a two-dimensional recording pattern can be formed.

Figure 2:
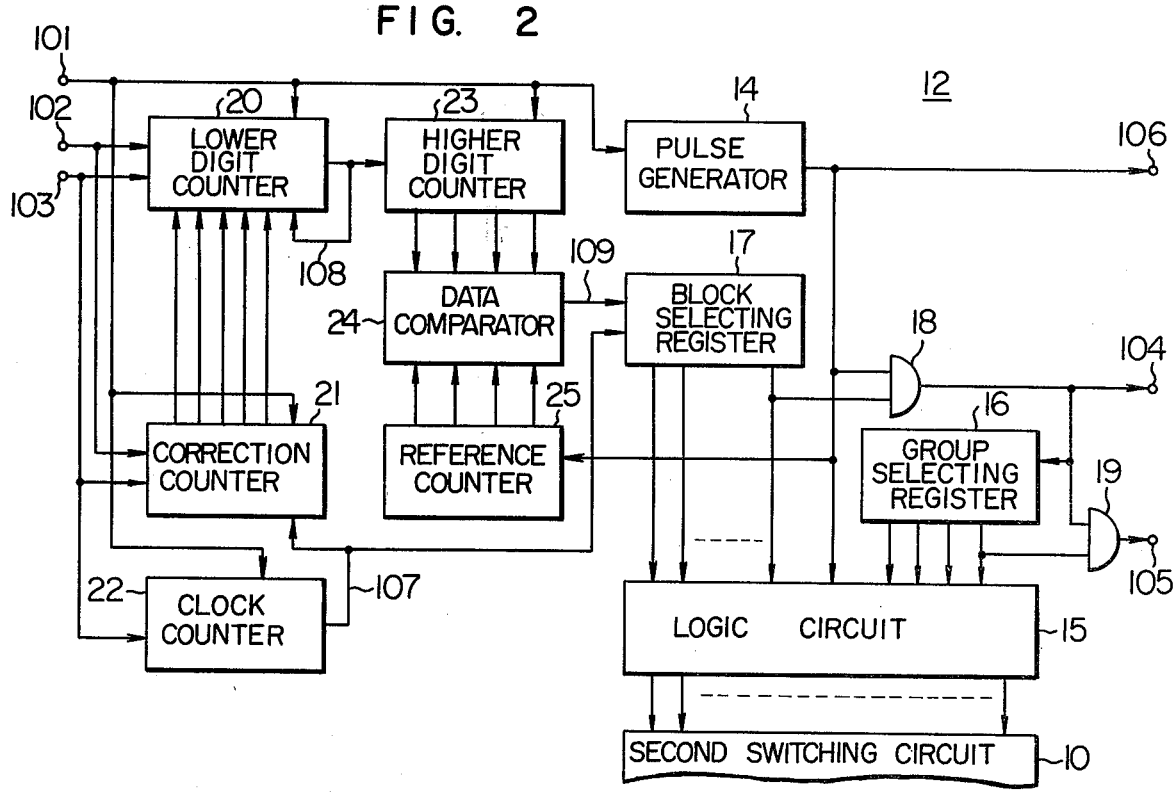
FIG. 2 is a block diagram showing one embodiment of the invention.
Figure 3:
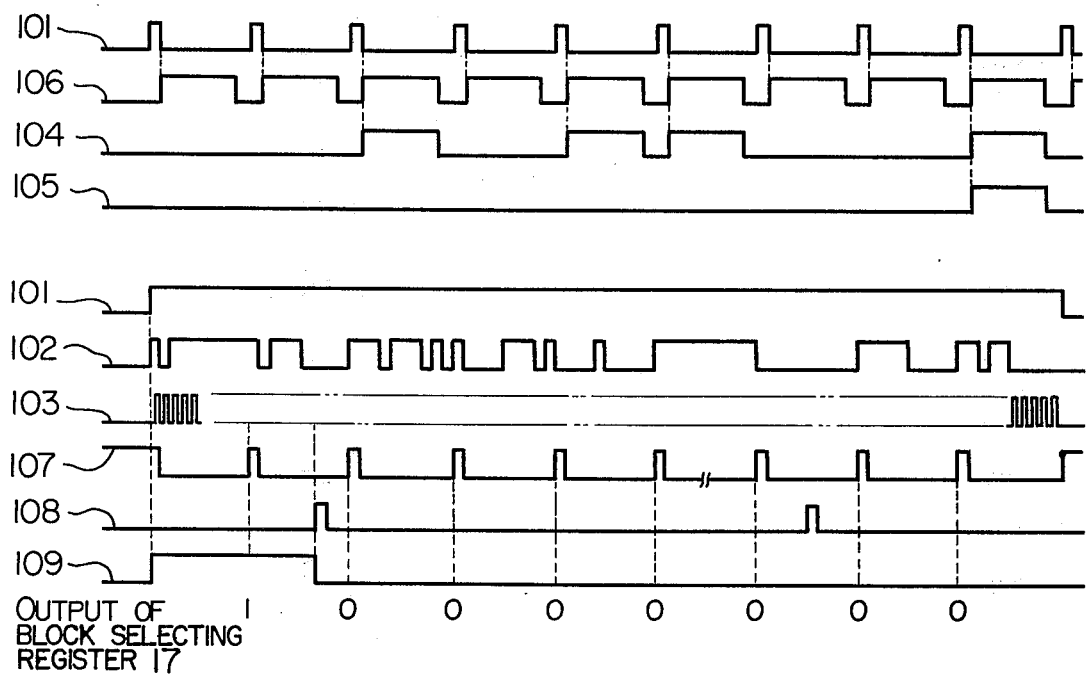
FIG. 3 is a waveform diagram useful to explain the operation of the embodiment shown in FIG. 2.

FIG. 2 shows, in a block form, a detailed construction of the heating block selecting section 12 shown in FIG. 1 and FIG. 3 shows signal waveforms useful to explain the operation of the heating block selecting section 12.

During the interval, as designated at 101, through which a strobe signal 101 exists, a recording signal 102 and a transfer clock pulse signal 103 are supplied to the data register 11 and the heating block selecting section 12, respectively, and 180 recording binary data are stored in the date register 11. On the other hand, the trailing edge of the strobe signal 101 causes a pulse generator 14 in the heating block selecting section 12 to send a current conducting pulse 106 to a logic circuit 15 from which the current conducting pulse 106 is delivered to one or more of 36 (9 blocks×4 groups) signal lines connected to the second switching circuit 10 in accordance with the result of logical operation of outputs from a group selecting register 16 and a block selecting register 17. This register 17 may be a 20 bit shift register (an M-bit shift register).

When the current conducting pulse 106 is generated from the pulse generator 14 with the final (9th) block being selected, this current conducting pulse is allowed to pass through an AND gate 18 to be delivered out as a group recording termination pulse signal 104. At this time, if the final (4th) group has already been selected, this group recording termination pulse signal 104 is also allowed to pass through an AND gate 19 to be delivered out as a line change pulse signal 105.

Meanwhile, a lower digit counter 20 and a correction counter 21 count the transfer clock pulse signal 103 only when the recording signal 102 is at a high level (meaning, for example, black dots) so as to count the number of occurrences of high levels in the recording signal. A clock counter 22 is a divide-by-20 counter which counts the transfer clock pulse signal 103 to produce a reset pulse 107 at the beginning of 20 transfer clock pulses. Thus, the correction counter 21 is reset by the reset pulse 107 at the beginning of the respective blocks so as to count the number of occurrences of high levels in that signal portion of the recording signal which corresponds to the each block. The lower digit counter 20 is a divide-by-48 counter, for example, which produces a carry pulse 108 each time the counted number of occurrences of high levels in the recording signal reaches 48 (a pre-set reference value K) to increment a higher digit counter 23 by one and, at the same time, to load the output of the correction counter 21 upon itself. The correction counter 21 is designed so as not to supply its output to the lower digit counter 20 unless the carry pulse 108 is produced. A reference counter 25 receives the current conducting pulse 106 to be incremented by one each time one recording data transfer cycle is completed (the transfer of 180 binary recording signal data is terminated). A data comparator 24 compares the count of the higher digit counter 23 with that of the reference counter 25 and when the counts are equal to each other, it produces a block drive pulse signal 109 having a pulse width corresponding to a time period during which both of the counts remains equal to each other. This block drive pulse signal 109 is stored in the block selecting register 17 with the reset pulse 107 being used as a writing pulse, which is generated from the clock counter 22 at that time interval which corresponds to a time length on the recording signal associated with the length of one block.

Accordingly, the block selecting register 17 produces an output which is used to simultaneously select such a number (P) of heating blocks that the number of occurrences of the high levels in the recording signal portion corresponding to (or dealt with by) the heating elements of the so selected heating blocks does not exceed 48. The AND gate is opened each time the final block is selected and the trailing edge of the current conducting pulse 106 increments the data of the group selecting register by one so that the respective groups are selected successively. As described above, the count of the correction counter 21 is supplied to the lower digit counter 20 when the counter 20 produces a carry pulse 108. The count of the correction counter 21 at this time represents the number of occurrences of the high level (the number of black dots) in the "residual" recording signal portion corresponding to (N−PXM) heating elements in the (P+1)-th heating block in case where the number N of the recording signal data at the time when the count of the lower digit counter 20 reaches the pre-set value K is not a multiple of the number M of the heating elements constituting one heating block, i.e., in case where $PXM < N < (P+1)XM$. It is apparent that this information concerning the number of occurrences of the high level in the "residual" recording signal portion is indispensable to correctly determine the next number P of successive heating blocks to be simultaneously enabled.

The recording data for the first group is fed repeatedly in accordance with the strobe signal 101, recording signal 102 and transfer clock pulse signal 103, each time the current conducting pulse 106 is fed. Then, this recording data is successively exchanged with the recording data for the subsequent group each time the group recording termination pulse signal 104 is fed. Finally, feeding the recording paper is performed by one line each time the line change signal 105 is fed. The above operation is repeated to form a desired recording pattern.

Figure 4:
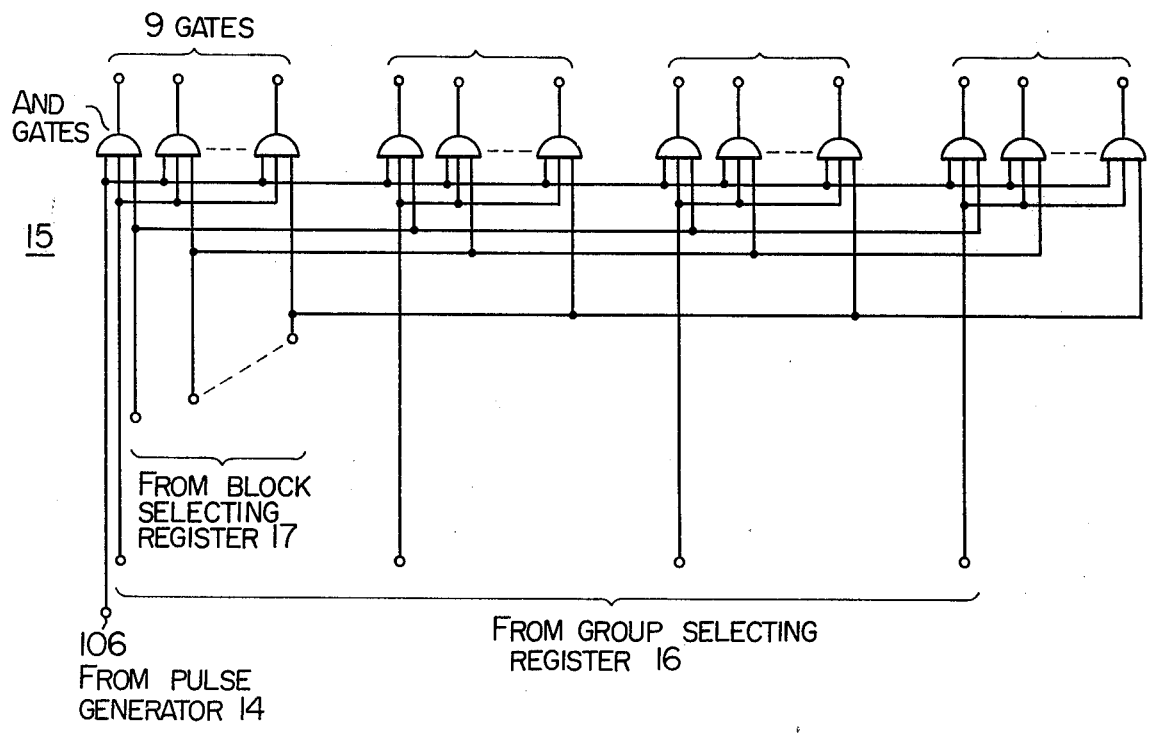
FIG. 4 is a circuit diagram of one example of a logic circuit shown in the block form in FIG. 2.

FIG. 4 shows an example of the logic circuit 15.

Figure 5:
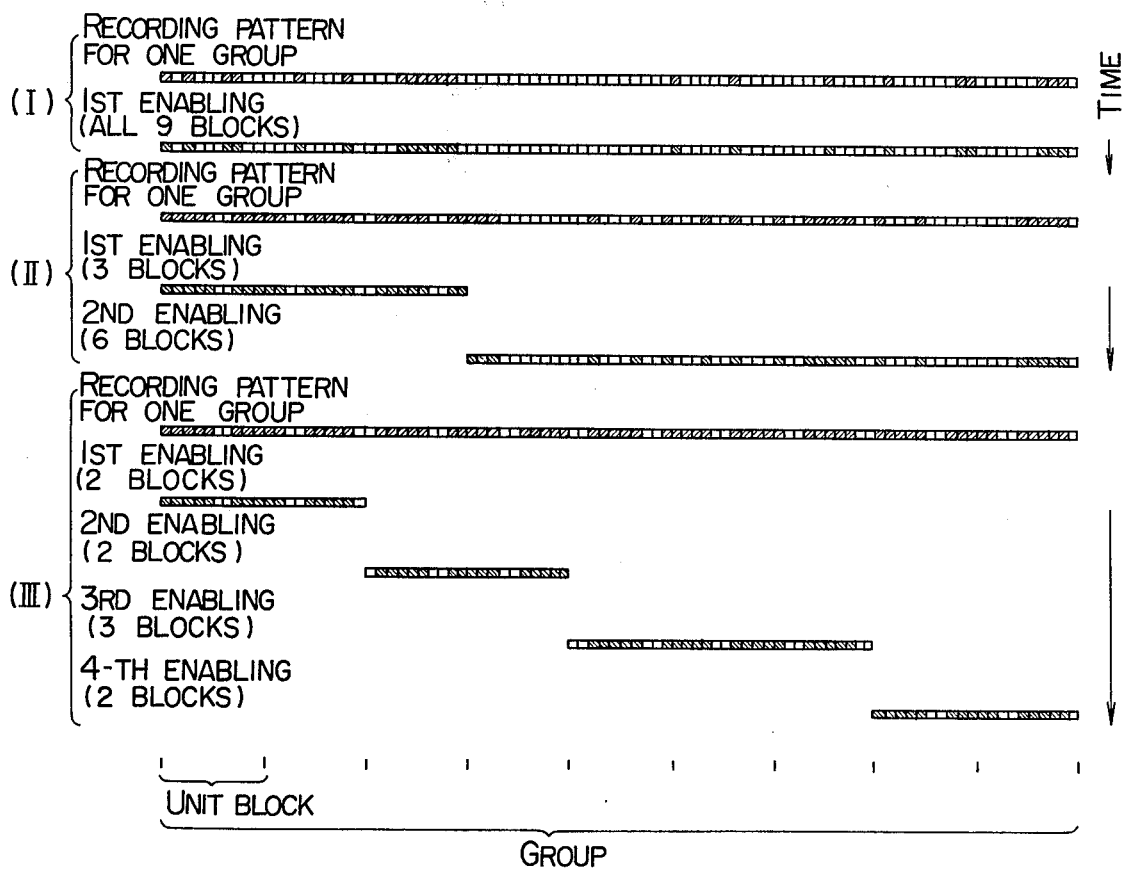
FIG. 5 is a diagram showing an enabling mode of the heating blocks in the embodiment of FIG. 2.

FIG. 5 shows, as exemplified by three cases the mode of enabling heating blocks of the thermal head according to the foregoing embodiment of the present invention. In each case, a recording pattern for one group is illustrated. Also, for simplicity of illustration, the number of heating elements (the number of recording dots)

in each group and the number of heating elements (the number of recording dots) in each block are decreased as compared with the number of those heating elements used in practical applications, and the distribution of black dots (high levels in the recording signal) is unpractically concentrated for clarity of illustration. As will be seen from the figure, in case (I) where the rate of occurrence of black dots (high levels in the recording signal) is relatively low, the heating elements included in all the blocks in one group are enabled simultaneously. In case (III) where the rate of occurrence of black dots (high levels in the recording signal) is relatively high, one group is divided into four sets of blocks, namely, two blocks, two blocks, three blocks and two blocks in accordance with the distribution of black dots in the recording signal and simultaneous enabling of the four sets of blocks is carried out in three times successively. In case (II) where the rate lies between the those of cases (I) and (III), one group is divided into two sets of blocks, namely, three blocks and six blocks in accordance with the distribution of black dots in the recording signal, and the first enabling is performed to effect the simultaneous enabling for heating elements in the three blocks and the second enabling is performed for heating elements in the six blocks. In connection with the embodiment of FIG. 2, of the heating elements included in one or more blocks which are enabled simultaneously, not more than 48 (48 being pre-set value K) heating elements are supplied with the current and caused to heat to display the black dots.

Figure 6:
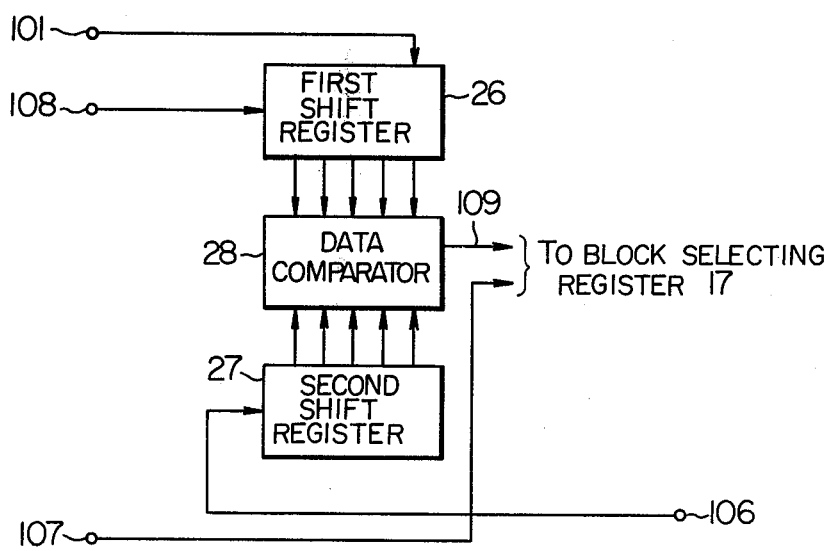
FIG. 6 is a partial block diagram of a modification of the embodiment shown in FIG. 2.

A modified embodiment as shown in FIG. 6 provides an arrangement which plays the part of the higher digit counter 23, reference counter 25 and data comparator 24 in FIG. 2. The arrangmenet comprises a first shift register 26, a second shift register 27 and a data comparator 28. A logic "1" is stored into the first shift register 26 each time the divide-by-48 lower digit counter 20 produces a carry pulse 108. A logic "1" is stored into the second shift register 27 in accordance with the current conducting pulse 106 each time one recording data transfer is terminated Accordingly, the data comparator 28 produces a coincidence signal quite similar to that of the foregoing embodiment.

As having been described, the present invention ensures the thermal recording in such an enabling mode of heating blocks that the recording current is always approximated to a constant in accordance with the distribution of high levels in the recording signal, thereby providing the thermal recording apparatus which can decrease the capacity of the power supply for recording and which is inexpensive and compact for the recording speed achieved. Further, the averaged heat generation in the thermal head facilitates the thermal design for excellent recording characteristics. In comparison with the prior art method of merely varying the number of divisional recordings, the invention can increase the number of divisional recordings without using complicated circuits and signal treatments, thereby ensuring more effective divisional recordings with the simple constructions.

I claim:

1. A method of driving, in accordance with a recording signal, a thermal head including a plurality of heating blocks each having M aligned heating elements (M: a positive integer), the amplitude of the recording signal being at a low level or at a high level, the method comprising:

(a) counting the number of occurrences of the high level in the recording signal;

(b) producing a heating block drive signal when the counted number reaches a preset value K (K: a positive integer larger than M), the sum of the number of occurrences of the high level and that of the low level in that signal portion of said recording signal within which the high level occurs K times being N;

(c) determining the number P of successive heating blocks (P: a positive integer) on the basis of said heating block drive signal such that $PXM \leq N < (P+1)XM$;

(d) simultaneously enabling the heating elements in the so determined P successive heating blocks in accordance with the signal portion of said recording signal within which signal portion the high level occurs not more than K times; and (e) re-starting the counting of the number of occurrences of the high level from zero when $PXM = N$ and from the number of occurrences of the high level in that portion of said recording signal which corresponds to first (N−PXM) heating elements in the (P+1)-th heating block when $PXM < N$ to determine the next number P of successive heating blocks the heating elements of which will be simultaneously enabled in accordance with the next signal portion of the recording signal within which the high level occurs not more than K times.

2. An apparatus for driving, in accordance with a recording signal, a thermal head including a plurality of heating blocks each having M aligned heating elements (M: a positive integer), the amplitude of the recording signal being at a low level or at a high level, the apparatus comprising:

means for counting the number of occurrences of the high level in the recording signal;

means for pre-setting a reference value K (K: a positive integer larger than M);

a comparator interconnected between said counting means and said pre-setting means to produce a heating block drive signal when said counted number reaches said pre-set value, said counting means restarting its counting operation each time said pre-set value is reached, the sum of the number of occurrences of the high level and that of the low level in that signal portion of the recording signal within which the high level occurs K times being N;

an M-bit shift register arranged to receive the output of said comparator; and a switching circuit means responsive to the output of said M-bit shift register to select P successive heating blocks for simultaneously enabling the heating elements of the selected heating blocks in accordance with that signal portion of said recording signal within which signal portion the high level occurs not more than K times (P: a positive integer) where $PXM \leq N < (P+1)XM$.

3. An apparatus according to claim 2, further comprising means for storing information representative of a number of occurrences of the high level in that portion of said recording signal which corresponds to first (N−PXM) elements in the (P+1)-th heating block when $PXM < N$ and means for feeding said stored information to said counting means so that said counting means restarts its counting operation from N−PXM.

* * * * *